United States Patent [19]

Wolf

[11] Patent Number: 4,599,038

[45] Date of Patent: Jul. 8, 1986

[54] FORK FOR A LIFT TRUCK VEHICLE

[75] Inventor: Theodore L. Wolf, Chardon, Ohio

[73] Assignee: Jos. Dyson & Sons, Inc., Ohio

[21] Appl. No.: 549,649

[22] Filed: Nov. 7, 1983

[51] Int. Cl.[4] .............................................. B65G 47/00

[52] U.S. Cl. .................................... 414/785; 187/9 R

[58] Field of Search ........................ 187/1 R, 9 R, 9 E; 414/785, 628, 629, 631, 630, 592, 724

[56] References Cited

U.S. PATENT DOCUMENTS

| | | | |
|---|---|---|---|
| 2,925,999 | 2/1960 | Hopkins, Jr. | 187/9 R |
| 3,528,580 | 9/1970 | Carliss | 414/785 |
| 3,876,039 | 4/1975 | Bushnell, Jr. | 414/785 |
| 3,876,090 | 4/1975 | Holland | 414/785 |

FOREIGN PATENT DOCUMENTS

| | | | |
|---|---|---|---|
| 254770 | 7/1967 | Fed. Rep. of Germany | 414/785 |
| 2907291 | 8/1980 | Fed. Rep. of Germany | 414/785 |
| 1109799 | 4/1968 | United Kingdom | 414/785 |

*Primary Examiner*—Joseph J. Rolla
*Assistant Examiner*—Kenneth Noland
*Attorney, Agent, or Firm*—Frank B. Robb

[57] ABSTRACT

A lift truck fork of substantially reduced weight without sacrificing load carrying capacity, the weight reduction being effected by forming at least one of the load or lift arms with a channel-like cross-section extending throughout a substantial portion of the length of such arm, additionally forming the flanges of said channel-like portions with parabola-like edges.

2 Claims, 6 Drawing Figures

FORK FOR A LIFT TRUCK VEHICLE

BACKGROUND OF THE INVENTION

This invention relates to forks for fork lift trucks and particularly to the desirability of reducing the weight thereof by certain changes in configuration.

The usual fork for a fork lift truck consists of an L-shaped body as viewed in side elevation, in which the off-standing arm which is designated herein as the load arm is an integrally connected element with an upstanding arm which for the purposes hereof will be denominated as a lift arm. The lift arm is provided with certain attaching elements for connecting the same to a lift truck structure and thus providing the necessary connection, such forks usually being used in pairs.

It is often the case that such lift forks are differently described, with the offstanding arm or longitudinal arm being designated as the blade and the upstanding arm as the shank. Irrespective of the descriptive designations, the functions are of course identical and as would be expected, very little has changed in the construction of such forks from the time of their initial use and construction.

It is of course also well known that forks are made in a number of different ways as by forging and bending during the forging process to comprise the L-shaped body which is commonly provided.

The extremity of the longitudinal or load arm, is tapered from a point about mid-way of such arm to the extremity, the main body of the fork being of rectilinear cross-section and of substantial size.

The possibilities of making many changes in a fork structure are obviously limited by the necessity to maintain the strength for lifting purposes which a heavy cross-section fork would normally have and obviously this cross-section is carried through the heel which comprises the connection of the load arm and lift arms and is of particular importance in the same as will be apparent, for load bearing purposes.

It might be noted that under some circumstances the load arm itself is a separate element and may be connected to a lift truck structure for certain uses and without other aspects being considered.

With the foregoing in mind, the efforts which have resulted in this invention, to in some way reduce the cost of the fork, have been directed toward various formations which the same may assume, it being recalled that where lifting ability is present, the thickness and width of the fork are important but primarily the thickness so to speak is the controlling factor in the usual contemplation and according to calculations which can be made by those skilled in the art.

The contemplation of this invention is therefore directed to various aspects of the fork configuration which as far as is known have not heretofore been contemplated at least for forks of substantial capacity and as far as any available on the market at the present time is known.

Having outlined the general field of the invention and the background thereof, it is contemplated by the disclosure herein to provide a different approach to fork manufacture, inasmuch as the cost of the fork is determined in large measure by the weight thereof and thus any weight reduction which can be effected will obviously reduce such cost and in the final analysis reduce the selling price thereof likewise.

With that in mind, the disclosure is set forth in detail hereinafter and disclosed in the drawing wherein.

DETAILED DESCRIPTION OF THE INVENTION

Figure 1:
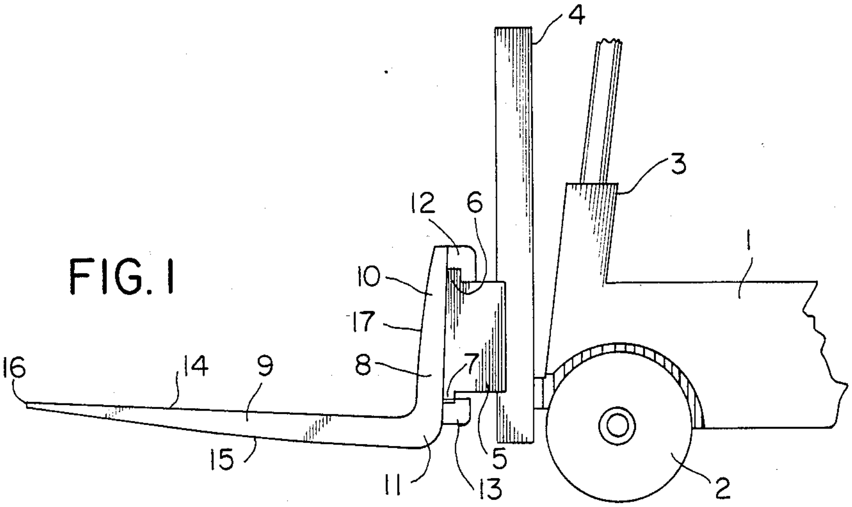
FIG. 1 is a fragmentary view of a lift truck of any conventional form having supported forwardly thereof a fork made in accordance with the concept herein in the L-shaped configuration as shown in elevation, as pointed out heretofore two of such forks usually being provided.

Referring now to FIG. 1, there is disclosed a fork lift truck at least as to the forward end thereof indicated at 1 supported on the travel wheels such as 2 with a mast 3 extending upwardly therefrom and connected to the truck in any preferred manner, and a pivotal frame 4 in turn connected to such mast for control thereby and for raising and lowering movement of a fork of L-shaped configuration supported by a carriage element 5 having suitable transversely extending rail portions 6 at the upper end and 7 on the lower portion thereof.

The fork shown in side elevation in this figure, is or generally conventional L-shape and designated 8, with the load arm portion 9 thereof extending longitudinally and the lift arm portion 10 thereof extending vertically being connected by a heel section 11.

At the upper end of the lift arm 10, is a suitable hook or a head 12 and a further hook 13 is provided to engage with the transversely extending rail 7.

The fork hereof, as to the load arm 9, is provided at its upper surface with a flat planar portion 14 which is usually provided, and however is formed under that planar portion with what may be termed a parabola-like surface 15, which extends from a very relatively sharp extremity at 16 to the heel portion 11 being the thickest part of said load arm.

Thus the surface 15 follows the parabola-like configuration as viewed in side elevation.

The lift arm is similarly formed but reversely so since the planar section thereof is at its rear and denoted 16 with the parabola-like surface 17 extending forwardly and as viewed in side elevation consisting of that parabola-like form.

It is of course understood that this parabola-like form 17 as disclosed is flat although following the contours suggested.

Figure 2:
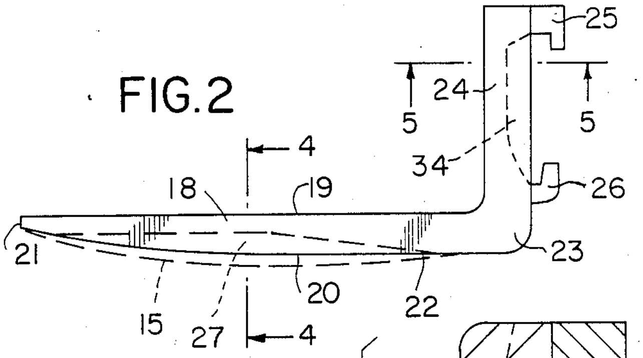
FIG. 2 is a side elevational view of a different form of fork as availing of some of the aspects of the invention.

Turning now to a consideration of FIG. 2, which shows a somewhat different form of fork for illustrative purposes, it will be seen that the load arm in this particular figure, designated 18, is configured with a planar surface 19 upwardly for support of the load, and at its lower surface is equipped with a further planar element 20 extending from the extremity 21 divergently to the lower surface 22, which in turn extends rearwardly in a parallel plane to the surface 19 until it is connected with the heel section 23.

The upright element or lift arm 24 is conventionally formed generally, but as will be explained both of these arms are modified in the ultimate analysis in accordance with the concept hereof as will be subsequently explained in detail.

The lift arm 24 is provided at its upper extremity with the usual head connecting element 25 which is hook-shaped as is well known and in some manner affixed to said arm such as by welding if not integrally formed therewith.

The usual hook element 26 is provided at the lower end of said arm near the heel of the fork.

Figure 4:
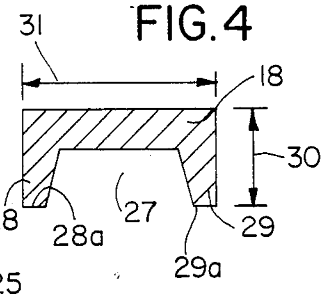
FIG. 4 is a transverse sectional view of the load arm of the fork taken about on the line 4—4 of FIG. 2 looking in the direction of the arrows.

The difference in this particular fork is by reason of its conformation, shown in FIG. 4 as to the load arm, which indicates that the same is generally channel-shaped including the channel area 27 thereof which is positioned between the flanges 28 and 29, which terminate in edges 28*a* and 29*a* respectively.

Thus the web of the channel area is of obviously reduced section as compared with the thickness of the usual fork which would be that designated by the arrows which are denominated 30, the width being designated by the arrows extending and denominated 31.

Figure 5:
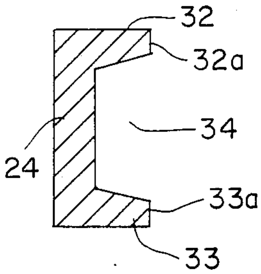
FIG. 5 is a transverse sectional view of the lift arm of the fork of FIG. 2 taken about on the line 5—5 of that figure.

As will be understood the lift arm 24 is similarly configured as suggested by FIG. 5 so that it comprises flanges 32 and 33 with corresponding edges 32*a* and 33*a* the open area of said channel section being denominated 34.

Figure 3:
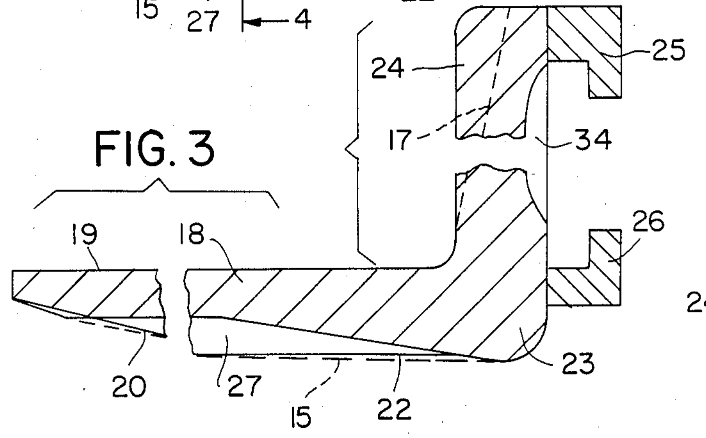
FIG. 3 is a longitudinal cross-sectional view of the fork shown in FIG. 2 to illustrate certain weight reducing aspects.

This is further illustrated in FIG. 3 to show the area which is cut out so to speak and thus comprises channel-shaped sections of the respective arms with the heel portion of said fork 23 being of the best considered and shape form consistent with the other shape of this fork but obviously of a solid transverse heavy section.

It might be explained that forks of this general shape are usually as to the most common size those forks which consist of a load arm for example about forty-eight inches long and a lift arm in the area of twenty-four inches high, being substantially two to one for all intents and purposes.

It is also to be understood that the channel-shaping of the respective arms is intended to extend for the greatest possible distance consistent with the load carrying capacity of said fork as can be and has been calculated under various loads for whatever purposes they may be necessary and to have the equivalent lifting capacity to that which is found in forks of solid configuration and of the conventional form of equal size as to length of load arm and height of lift arm.

As suggested in FIG. 2, if the load arm 18 is configured as to its lower surface really, surfaces since this illustrates a channel-shaped portion generally, with the parabola-like form of outline suggested in FIG. 1, and by the dotted line designated A in FIG. 2, with a configuration suggested by the dotted line B in FIG. 2, further weight reduction will be accomplished as compared with the conventional fork of what may be termed generally rectilinear configuration throughout.

The fact of the matter is that by initially configuring the fork as shown in FIG. 1 with parabola surfaces 15 and 17 used, a weight reduction of approximately 10 percent of the fork as compared with a conventional fork will be provided.

Where the channel-shaped fork of FIG. 2 is provided without more, a 10 percent saving at least can be provided likewise.

By combining the respective configurations suggested in FIG. 2 so that the parabola-like surfaces A and B are provided with the channel section, a weight saving of approximately 20 percent is accomplished.

As will be apparent such weight saving is in fact a very substantial amount and obviously results in an ability to sell the forks at a less cost after manufacturing costs are reduced likewise.

Figure 6:
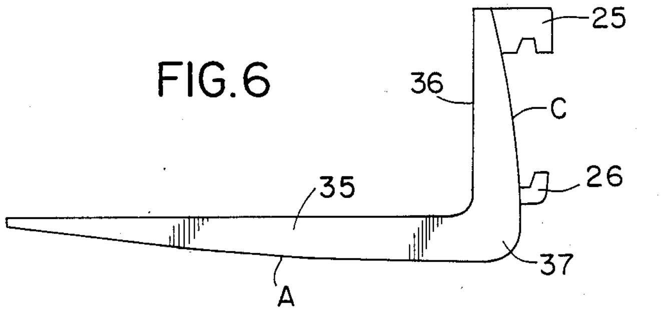
FIG. 6 is a side elevational view of a fork formed similarly to that of FIG. 1.

It may be noted that in FIG. 6 the fork disclosed is provided with a different exterior configuration as to the lift arm since the parabola-like portion is in rear of the arm as indicated at C with the same kind of parabola-like configuration A being used therein, the fork load arm 35 being connected to the lift arm 36 by the heel 37 in somewhat conventional fashion being integral obviously.

This fork configuration may be necessary because of manufacturing problems but basically the concept of parabola-like configuration is used here for the same purposes namely weight saving as is accomplished by the prior forms disclosed.

It is of course obvious that the fork of FIG. 6 may have a similar channel-like configuration as to both of its arms as is true of FIG. 2, and FIG. 3, and thus further weight saving accomplished likewise.

In view of the detailed description, it will be apparent that the objects of the invention have been carried out as to weight saving and it is the entire value of the invention found in this particular arrangement, with the suggestion that there may be other cross-sectional configurations which could accomplish similar weight reduction or possibly more bearing in mind that the thickness so to speak of the load arm and lift arm are the controlling factors in lifting strength.

Thus where the usual fork is four inches wide and about 1 $\frac{3}{4}$ inches thick as to the major dimensions, it is possible to make a fork of 3 inch width and 2 inch thickness which will have the same lifting capacity, and yet with the configurations described in the previous forms herein, additional weight saving accomplished which is desirable and may be necessary without sacrificing the lifting ability at all.

Further to the matter of weight saving which is all important as has been heretofore explained, and analyzing the various relationships more closely, I have discovered that there is a definite formula which is suitable to determine certain fundamental dimensions of a fork as to the cross-sectional area of the load arm at the load center.

Previously arbitrary dimensions of forks have been the rule and little or no real consideration has been given to the capacity of the machine which the forks are designed to fit and by which they are manipulated to perform their function.

In practice, machines are of a certain rated capacity but the forks have been somewhat arbitrarily proportioned depending on the size of the original bar or the like from which they are formed to support the load with larger cross-section than really necessary. Thus considerable additional weight has been incorporated in the forks.

It may be noted that the machines with which forks are used, are classified according to their load carrying capacity ranging from 2,000 pound capacity to 14,000 pound capacity and the forks in general have been greatly oversized throughout that range being of greater cross-sectional area as the machines are of larger capacity.

Irrespective of the foregoing, and more particularly considering the same, it has been determined that a machine of any given capacity should have a suitable fork or forks especially sized therefore, by availing of a formula in which the width and thickness of the fork are determining factors, together with the load for which the lift truck is rated.

For example, I have determined that a formula in which a constant (K), determined to be 2.5, multiplied by the thickness cubed equals 0.0036 times the load, is appropriate.

In practice the load equals the truck rated capacity divided by 2 in view of the fact that two forks are mounted on the fork lift truck and the cross-section of one is being developed.

With that in mind, a fork can be calculated as to dimensions by inserting the necessary dimensions in the formula and thus ascertain the cross-sectional area at the load center of a fork or forks which will handle the capacity requirements of the fork lift truck with which the same is to be associated.

I have found that by adopting this procedure, a further saving in weight of an important amount is accomplished.

As an example a presently available fork where the width is 100 mm., thickness would be 45 mm. providing a rated capacity of 3,430 pounds for each fork at its 24 inch load center. Since lift trucks are rated from 2,000 pounds capacity and greater in 1,000 or 2,000 pound increments it is obvious that 430 pounds of excess load carrying capacity for each fork has been provided when used on a 6,000 pound lift truck.

Assuming that a fork is provided in accordance with my formula, the fork having the relationship of 45 mm.×100 mm. could be reduced to a cross-section of 43.0 mm.×95.6 mm. and handle the load for which the machine is designed. Thus in providing forks for various fork lift truck rated capacities, using the concept set forth, a weight reduction of 14.5% is effected for fork lift trucks in the range of 2,000 to 14,000 pound capacity.

It should be pointed out however that while lifting capacity or ability of the forks is not affected adversely by the configurations disclosed and described in detail, there may be some additional deflection under maximum loads without at the same time destroying the fork or otherwise adversely affecting its use.

When the term fork is used, it is understood that plural use of the term is intended where necessary and applicable, usually a pair of forks being supplied for most circumstances.

I claim:

1. A fork for a fork lift truck having a forged body comprising a longitudinal load arm adapted to support a load and for connection at one end to a lift means, said body including an integral vertical lift arm extending from the load arm providing the connection aforesaid, said lift arm having a surface of parabola-like conformation in side elevation, the load arm is of unobstructed open-ended channel-like cross-section throughout a substantial portion of its length, open at least at one end and having flanges extending throughout only at said substantial portion of its length, the flanges having the parabola-like edge conformation described.

2. A fork for a fork lift truck comprising an L-shaped forged body having a longitudinal load arm and an integral upright lift arm connected thereto and arranged for attachment to lifting means of a fork lift truck, said arms being of unobstructed open-ended channel-like cross-section throughout a substantial portion of their respective lengths, one of said arms being opened at least at one end, said arms having flanges extending throughout only at said substantial portion of their respective lengths, the flanges of at least one of the arms include edges of parabola-like conformation in elevation.

* * * * *